July 21, 1970 J. M. MALJANIAN 3,521,446
FUEL CONTROL HAVING PRESSURE REFERENCED
TURBINE OVERSPEED DEVICE
Filed April 16, 1968 5 Sheets-Sheet 1

INVENTOR
JOHN M. MALJANIAN
BY Radford W Luther
ATTORNEY

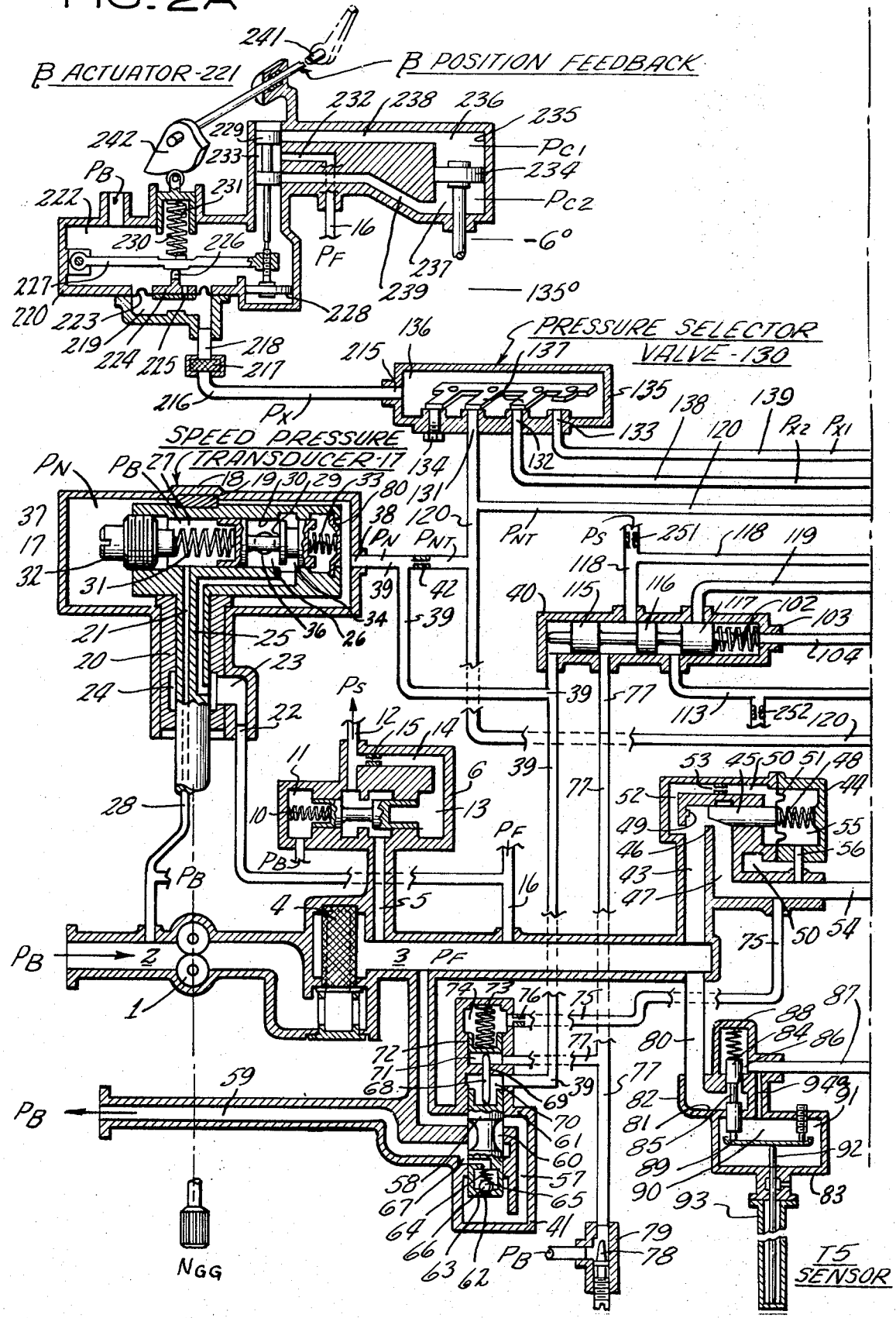

FIG_3
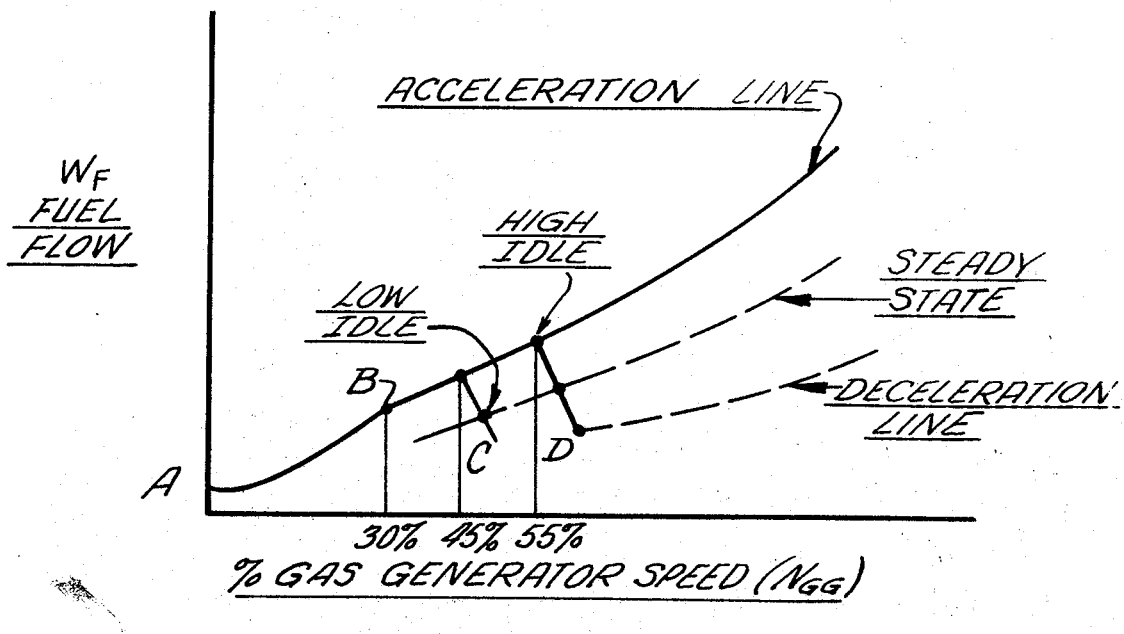

United States Patent Office 3,521,446
Patented July 21, 1970

3,521,446
FUEL CONTROL HAVING PRESSURE REFERENCED TURBINE OVERSPEED DEVICE
John M. Maljanian, Newington, Conn., assignor to Chandler Evans Inc., West Hartford, Conn., a corporation of Delaware
Filed Apr. 16, 1968, Ser. No. 721,800
Int. Cl. F02c 3/10, 9/00, 9/08
U.S. Cl. 60—39.16    8 Claims

ABSTRACT OF THE DISCLOSURE

An improved fuel and speed control for a regenerative gas turbine having variable geometry turbine nozzles where the fuel metering operation is based on a hydraulically computed composite function of gas generator speed, compressor inlet temperature, ambient pressure and regenerator discharge temperature, and the turbine engine variable geometry nozzles are simultaneously integrally positioned with the fuel metering device and speed setting governor such that the preselected positions of the variable geometry nozzle at the start-idle governing and retard braking conditions are maintained by varying the working fluid pressure referenced to control pump boost pressure, and the power turbine over-speed control limits the turbine speed by varying a second working fluid pressure responsive to variations in power turbine speed pressure signal referenced to ambient pressure.

BACKGROUND OF THE INVENTION

This invention pertains generally to fuel control systems for operation in conjunction with a gas turbine engine having a regenerator and a variable turbine nozzle system to produce low specific fuel consumption in orders of magnitude comparable to diesel engines.

The general problems associated with the control of gas turbine engines with a regenerator and a variable turbine nozzle system are described in detail in U.S. patent application Ser. No. 686,522 of Inventor John M. Maljanian entitled "Fuel Control" filed Nov. 29, 1967, and assigned to the same assignee as the instant application. Reference may be had to said application No. 686,522 for a detailed description of the operation of a gas turbine engine utilizing a regenerator and a variable turbine nozzle system, which, since it has already been described, will not be repeated in this application.

Also, said U.S. application Ser. No. 686,522 presents a detailed description and explanation of the construction of a fuel and speed control for a regenerative gas turbine in which the fuel metering operation is based on an hydraulically computed composite function of gas generator speed, compressor inlet temperature, ambient pressure, and regenerator discharge pressure; wherein the engine power turbine variable geometry nozzle is simultaneously integrally positioned with the fuel metering device and the speed setting governor to provide cruise economy, as well as start, idle, acceleration and retard nozzle angles responsive to a computed hydraulic signal. Again, since this structure has already been described, it will not be repeated in this application.

It will be noted in the detailed construction of the fuel supply and control system disclosed in application No. 686,522 that the power turbine speed device incorporates a diaphragm 157 that divides the valve housing into an upper 154 and a lower cavity. The lower 159 cavity is referenced to tank pressure ($P_t$). It has been found in certain installations that the supply tank is located a considerable distance from the fuel control thereby necessitating a great length of conduit to connect the fuel tank to the outlet of said lower cavity 159. The fluid flowing through this long length of conduit generates a pipe loss which introduces an undesirable pressure error in the tank reference pressure. This error in turn generates a corresponding power turbine overspeed signal error.

Further, the upper cavity 154 of said power turbine overspeed device receives hydraulic oil that communicates the power turbine speed pressure function. The lower cavity receives fuel under pressure that is communicated to the turbine combustion chamber where it is burned to produce the primary turbine power. The upper and lower cavities are separated by a flexible diaphragm. In the event the diaphragm is ruptured, hydraulic oil is mixed into the turbine fuel with a resulting undesirable combustion condition.

Additionally, with the retard solenoid 194 energized, boost pump pressure is communicated to one of the fixed restrictions 166 of said lower cavity of the power turbine overspeed device while tank pressure is communicated to the other fixed restriction 167 of said lower cavity. Since pump boost pressure is greater than tank pressure, an undesirable leakage condition results whereby fluid flows from the pump boost pressure connection through the lower cavity back to the supply tank. This leakage condition is present when the idle-start valve has been closed by the action of the power indicating a retard condition.

Additionally, since the magnitude of the pump boost pressure is always greater than the supply tank pressure, the orifice +66 in the lower cavity of the power turbine overspeed device reflecting pump boost pressure must be considerably smaller than the corresponding orifice 167 positioned in the lower cavity referenced to fuel tank pressure. It has been found that the small size of the orifice connected to pump boost pressure has resulted in partial clogging with resultant error in the reference pressure generated in the said lower cavity.

This invention comprises an improved fuel and speed control for use with a regenerative gas turbine incorporating a variable geometry turbine nozzle system and incorporating a power turbine overspeed device wherein the lower cavity is referenced to ambient pressure and fuel pump boost pressure is removed from said lower cavity thereby eliminating boost pressure leakage and power turbine overspeed signal error caused by reference pressure signal error.

SUMMARY OF THE INVENTION

In accordance with the present invention, an automatic fuel and speed control apparatus, as disclosed in U.S. application No. 686,522 entitled "Fuel Control" filed on Nov. 29, 1967 in the name of John M. Maljanian, has been structurally modified to incorporate a power turbine overspeed device referenced to ambient pressure thereby eliminating the reference to tank pressure and the attendant long pressure conduit from the power turbine overspeed device to the fuel supply tank necessitated in some installations.

An object of the present invention is to provide a fuel and speed control apparatus having a power turbine speed responsive device referenced to ambient pressure such that the device does not generate an error in the turbine overspeed signal due to an error in referenced pressure caused by pressure losses resulting from long fluid conduits.

A further object of the present invention is to provide a control in which the power turbine overspeed device is referenced to ambient pressure such that a rupture of the pressure responsive diaphragm will not mix hydraulic oil with the fuel, but will instead drain the hydraulic fluid overboard through the ambient pressure chamber.

A further object of the present invention is to provide a control apparatus wherein the restriction device controlling the turbine nozzle idle position and the turbine start-idle valve are connected to control pump boost pressure through the open position of a two-position retard valve such that no leakage to the fuel supply tank is present when the retard valve is in the closed position.

A further object of the present invention is to provide a control apparatus wherein by connecting the reference chamber pressure to ambient pressure the power turbine overspeed device will produce a more suitable reference pressure signal than a chamber having a fixed restriction connected to tank pressure and a second fixed restriction connected to control pump boost pressure.

Many other objects, features and advantages of the instant invention will become apparent upon reference to the succeeding detailed description and to the drawings illustrating the preferred embodiment thereof.

DESCRIPTION OF THE DRAWINGS

The following is a brief description of the drawings accompanying the detailed description of the instant invention.

FIGS. 2A and 2B shows somewhat diagramatically a control apparatus embodying the principles of the instant invention.

FIGS. 3 through 6 inclusive are diagrams of certain operating characteristics of the apparatus shown in FIG. 2.

DESCRIPTION OF THE PREFERRED EMBODIMENT

The concept of the hydromechanical fuel metering system and variable geometry power turbine nozzle assembly, its application, analysis and structure as broadly comprehended and disclosed herein has already been described in detail in U.S. application No. 686,522 entitled "Fuel Control" and filed on Nov. 29, 1967 in the name of John M. Maljanian, to which reference is made, and therefore is not repeated.

Figure 1:
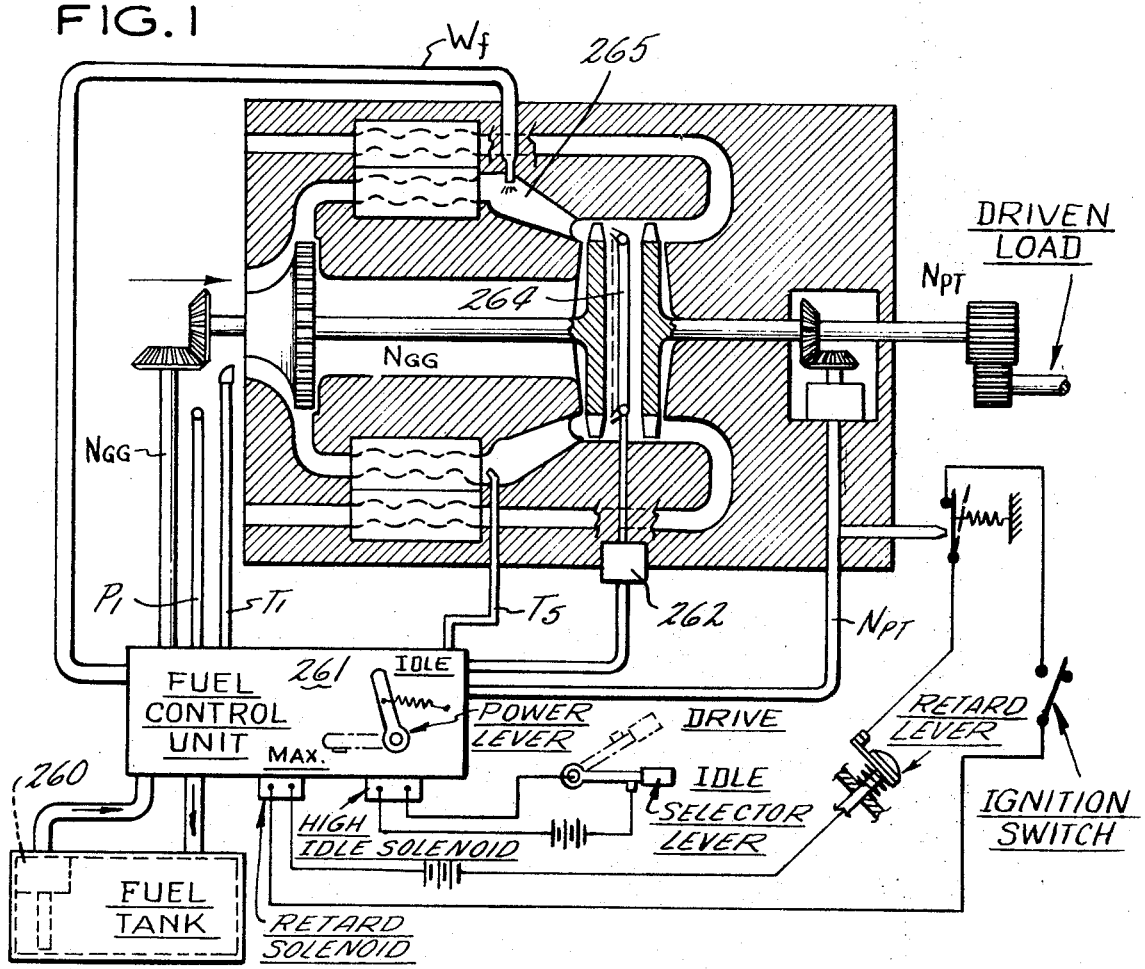
FIG. 1 is a schematic diagram of a regenerative gas turbine engine incorporating variable angle power turbine nozzles with the associated control apparatus of the instant invention in conjunction with a boost pump and manual control levers.

Referring now to FIG. 1, the instant fuel metering and speed control mechanism comprises an integrated fuel pump 260, fuel control 261 and turbine nozzle actuation control 262 for use with a regenerative automotive gas turbine having variable position power turbine nozzles 264, and includes selected vehicle signals to which the disclosed apparatus responds to schedule fuel inputs to the engine to provide start, idle, acceleration, braking and economy range functions.

Figure 2B:
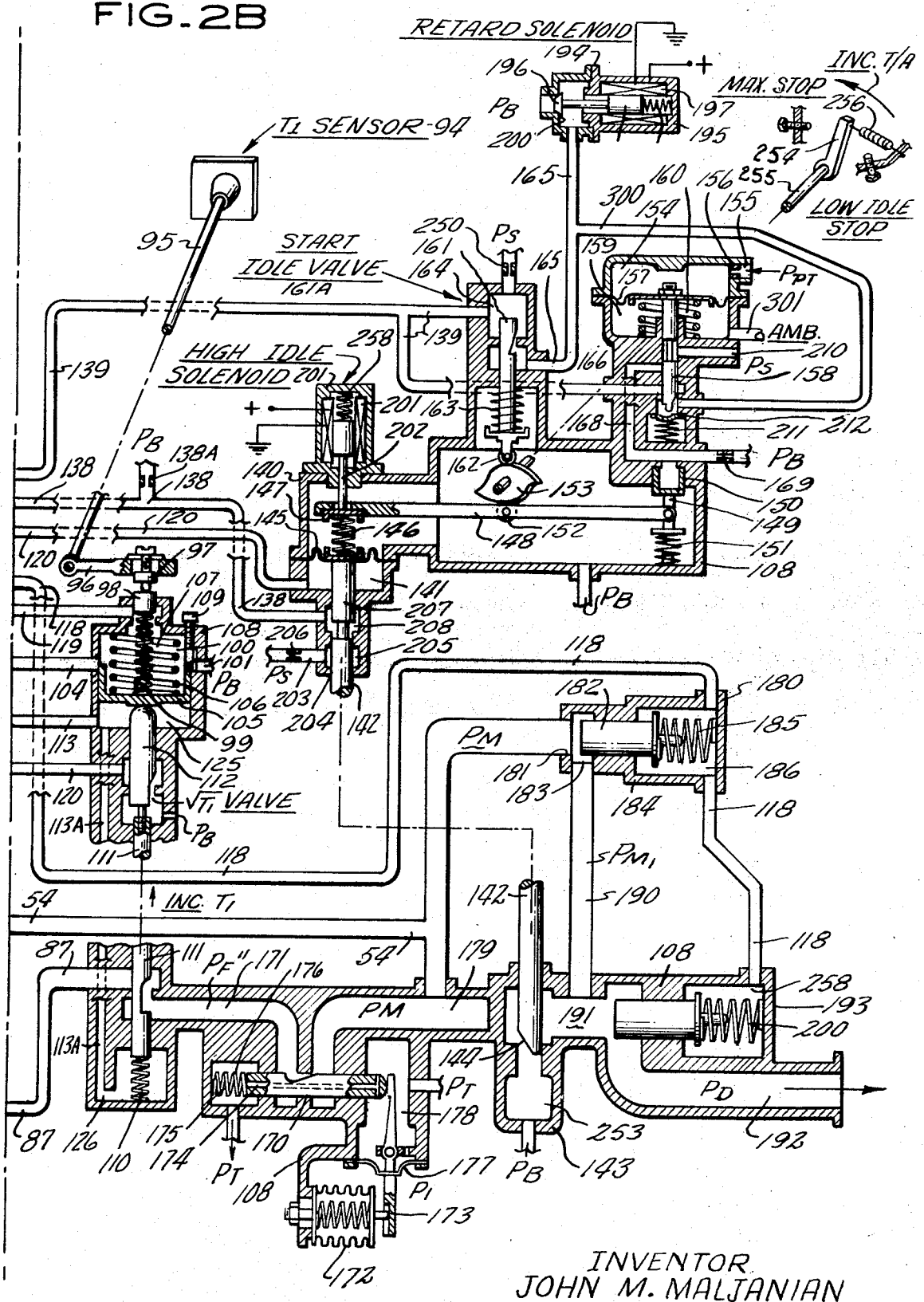

The integrated system, as shown in FIG. 1, comprises a boost pump 260 to supply pressurized fluid at boost pressure ($P_B$) to the main pump of a control system 261 with the main pump 2 generating a pressure flow needed to supply metered flow to the combustor 265 and operate a nozzle position actuator 262. As shown in FIGS. 2A and 2B, the system also comprises a metering system 41, 83, 111, 170 and 142 to control engine fuel supply during starting, acceleration, deceleration, and to maintain a steady-state gas generator speed selected from the governed range; and a control computer 17, 40, 130 and 221 which schedules nozzle actuator position.

Referring now to FIGS. 2A and 2B wherein like numbers are used throughout to designate like elements in U.S. application No. 686,522, filed Nov. 29, 1967 in the name of John M. Maljanian, as well as the instant invention, the governor valve assembly, shown generally at 143, is positioned intermediate said pressurizing valves and conduit 190 and in series relationship with passageway 191. Speed governor valve member 142 is provided to bypass metered flow in accordance with the speed error position of valve member 142 as determined by the pressure differential across diaphragm 145 affixed to valve member 142 and by the load applied to valve member 142 by governor compression spring 146. One end of lever 148 is pivotably mounted to power turbine maximum speed governor plunger member 149 which is biased against shoulder 150 of housing 108 by maximum speed reset compression spring 151 positioned intermediate plunger member 149 and housing 108. Roller 152 is pivotally attached to lever 148 to engage the contoured surface of cam 153 under the influence of a tracking force supplied by spring 146. Cam 153 is positioned by means of a manually operated power lever 254 fixed to cam 153 by means of interconnected shaft 255. Clockwise rotational movement of cam 153 will cause lever 148 to pivot about member 149 in a counterclockwise direction to cause valve member 142 to move downward until the force of spring 146 again balances the pressure load across diaphragm 145 thereby decreasing bypass flow across contoured surface 144 of valve member 142 and increasing the flow delivered to the engine. Conversely, bypass flow increases responsive to clockwise movement of lever 148 about the pivotal connection to 149. During any high flow power lever position of cam 153 when member 149 is caused to move away from shoulder 150, the pressure in cavity 141 acting on diaphragm 145 will cause valve member 142 to advance toward lever 148 until the pressure in cavity 141 and the force of governor spring 146 balances, thereby increasing the flow bypassed through governor valve assembly 143 to boost. A power turbine overspeed device is provided to cause fuel to be bypassed to boost by causing member 149 to move away from shoulder 150 thereby making ineffective the power lever demand for high fuel flow delivery to the engine. A second speed pressure transducer (not shown) which can be similar to transducer 17 is provided, said second transducer drive mechanism is coupled to the power turbine to provide a pressure that is a function of power turbine speed. The power turbine speed signal is introduced to cavity 154 of housing 108 via passageway 155 containing therein fixed area restriction 156. Diaphragm 157 affixed to valve spool 158 separates cavity 154 from cavity 159. Helical compression spring 160 positioned in cavity 159 urges diaphragm 157 towards cavity 154. Metering spool 161 of start-idle nozzle position schedule valve 161a is partially disposed in cavity 164 and has a roller end 162 thereon. Helical compression spring 163 positioned coaxial spool 161 urges spool 161 to track cam 153, thereby controlling flow from cavity 164 to conduit 165 and interconnected conduit 300. An equilibrium position of diaphragm 157 and valve spool 158 which is upset by an increase in speed signal pressure in cavity 154 will produce a downward motion of valve spool 158. Downward motion of valve 158 will meter fuel at servo supply pressure introduced at port 210 to passageway 168, thence via a fixed area restriction 169 to boost pressure. Pressure in passageway 168 approaching servo supply pressure will overcome the preload of reset spring 151 against valve member 149 thereby causing 149 to move away from shoulder 150 to make motion of cam 153 ineffective to control speed until the power turbine speed signal pressure is reduced sufficiently to permit spring 160 and spring 211 to urge valve spool 158 to a position restricting flow to passageway 168. The shifting of valve spool 196 controls the pressure in cavity 159 by venting or closing conduit 165 to boost pressure across solenoid operated retard valve 194. Retard valve 194 includes a housing 195 having a valve seat 200 formed therein. A solenoid coil 197 located in housing 195 is connected to an external electrical source to produce a force field to drive core member 198 against bias spring 199 to thereby lift core member 198 and interconnected valve 196 away from seat 200. A similar solenoid 201 is mounted to housing 108 such that core connected plunger 202 urges lever 147 towards valve member 142 when deenergized, thereby reducing bypass flow to boost pressure and increasing compressor turbine speed to a high idle setting. When solenoid 201 is energized, plunger 202 retracts; bypass flow is increased, and a lower compressor turbine idle speed results. Servo pressure is supplied to conduit 203 leading to passageway 204 and annular cavity 205 in housing 108 via area restriction 206. Annular relief 207 on valve member 142 produces an annular passageway connecting annular cavity 205 with cavity 208 located downstream thereof to provide low bypass flow positions of valve member 142. Cavity 208 is in fluid communication with conduit 138 connected to pressure selector valve 130.

Valve spool 158 engages retainer 212 of spring 211 at a valve underlap or dead band position such that flow from passageway 210 to passageway 168 is prevented by the lands of valve 158. Further movement of a given increment by valve spool 158 requires a disproportionately large increase in power turbine speed signal pressure in cavity 154 to overcome the preload supplied by spring 211. Fluid in conduit 139 bleeds to boost across spool valve 158 at low values of pressure in cavity 154 when valve 158 and spring retainer 212 have a gap therebetween.

Cavity 136 in pressure selector valve 130 is fluidly interconnected with port 215, conduit 216, filter screen 217, port 218 and cavity 219 located within housing 220 of power turbine nozzle actuator, shown generally at 221. Cavity 219 is separated from cavity 222 by diaphragm 223 having disk 224 affixed thereto. Disk 224 has a flow restrictive aperture 225 therethrough and a projection 226 thereon. Cavity 222 is always referenced to boost pressure, hence aperture 225 provides a bleed means to prevent hydraulic lock of the pressure selector valve which otherwise would occur when the highest pressure input valve 130 began to decrease. Lever 227 pivotably mounted at one end has adjustably affixed to the other end stop member 228 and servo spool 229; the connection to said other end being sufficiently flexible to prevent significant side loads from being applied to spool 229 as lever 227 moves about its pivot point under the influence of the combined forces exerted by position feedback piston 231 and spring 230, and the opposing force produced by the pressure difference across diaphragm 223. Pump discharge flow via conduit 16 is introduced to passageway 232 in housing 220 and thence to annular cavity 233 formed between a pair of lands on valve 229. Differential area piston 234 is axially slideably mounted in bore 235 of housing 220 thereby forming large area variable volume cavity 236 and small area variable volume cavity 237, said cavities alternately being placed in fluid communication with cavity 223 by passageways 238 and 239 respectively. Piston 234 has a rod 240 affixed thereto, said rod being operably connected to a power turbine nozzle positioning apparatus (not shown), and to a nozzle position feedback shaft 241 suitably journaled and having affixed thereto a cam 242 tracked by a roller affixed to position feedback piston 231 under the influence of spring 230 and boost pressure in cavity 222. This is a closed loop force feedback servo system where piston 234 position is proportional to the pressure difference across diaphragm 223.

Pressure selector valve 130 receives three input pressure signals via conduits 131, 132 and 133 and transmits only the highest sensed pressure via interconnected chamber 136 and conduits 215, 216 and 218 to the β-position actuator servo input diaphragm 223. The β-actuator 221 provides turbine nozzle position as a function of pressure applied to diaphragm 223 via chamber 219. The β-command pressure in chamber 219 operates servo valve 229 which ports fuel to actuator 234 to position the nozzles. Actual β position is fed back via cam 242 to null the servo valve by a force balance between input command pressure and the force of spring 230 acting on lever 227 connected to servo valve 229.

OPERATION

To facilitate a better understanding of the principal problems solved by the instant invention, a brief summary of the essential operational features of the control system and the functions of each operation is presented herewith.

Start-low idle condition

During the start operation, it is desired to supply fuel to the gas generator in accordance with the A to B portion of the fuel flow-speed curve as shown in FIG. 3. Referring generally to FIGS. 1 and 2, at engine start the ignition key is turned on thereby energizing retard solenoid, shown generally at 194. Referring to FIG. 2, when the retard solenoid 194 is energized, the retard valve 196 and plunger 198 are retarded, thereby connecting interconnected conduits 165 and 300 via chamber 200 to pump boost pressure. The power lever 254 is normally positioned on the low idle stop during the start operation by the operation of power lever retaining spring 256. When the power lever 254 positioned on the idle stop, cam 153 fixedly connected to the lower lever 254 by interconnected shaft 255 is positioned such that roller 162 of valve 161 is urged into engagement with the low rise contour surface of cam 153 under the influence of the tracking force supplied by spring 163. In this position, start-idle beta schedule valve 161A is closed.

The pressure in chamber 159 of power turbine max speed governor is at ambient pressure since chamber 159 is connected to ambient pressure via conduit 301. At the start of engine operation the pressure in chamber 159 is at ambient pressure which is greater than the turbine power speed pressure signal in chamber 154. Thus spring 160 and ambient pressure urge the power turbine speed regulator valve 158 to the full open position. With the start-idle valve 161 in the closed position, fluid at servo pressure ($P_s$) is conveyed through fixed restriction 250, via interconnected chamber 164 and conduit 139 to valve 158 and thence returned to the pump at boost pressure ($P_B$) via conduit 300 and chamber 200 of retard valve 194. Valve 158 at the full open position is contoured to provide a preselected restriction in conduit 139 such that a pressure of preselected magnitude (approx. 70 p.s.i.) is formed in conduit 139 and transmitted to chamber 136 of pressure selector valve 130 such that turbine nozzle actuator 234 positions the turbine nozzles at the preselected turbine nozzle start angle. As the gas generator starts, pump 1 starts to pump fluid through the metering system via interconnected conduits 3, 80, 87, 171, 179 and 54. Pressurizing valves 180 and 193 block the flow of fluid downstream of the aforementioned interconnected conduits until a pressure sufficient to overcome the force of springs 185 and 200 has been generated. This initial action of the pressuring valves assures a minimum servo pressure is supplied to the control servo supply regulator 6 prior to the delivery of metered fuel to the gas generator combustor. Servo pressure is supplied through fixed restriction 251 to speed pressure switch 40 via conduit 118 and thence through conduit 77 to chamber 71 and variable bleed valve 79. The pressure in chamber 71 acts on valve 72 to generate a force that opposes the force of spring 73 to establish the gas generator fuel flow regulated metering head pressure during startup. Fuel flow schedule from point A to B, as shown in FIG. 3, is defined by the magnitude of the bias pressure in conduit 77, as established by the adjustment of variable bleed valve 78.

Figure 6:
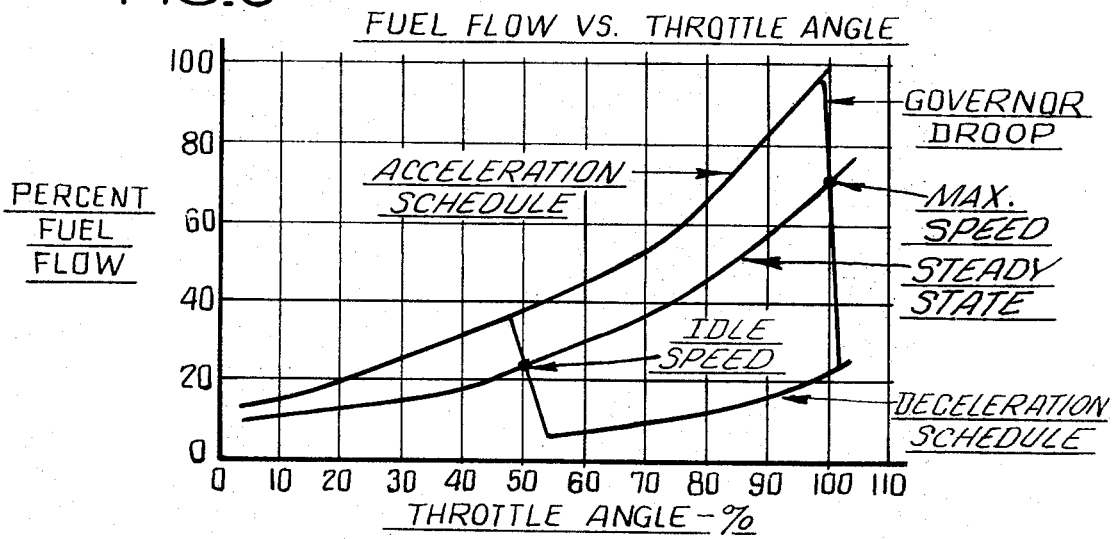

Servo pressure is admitted to conduit 113 through fixed restriction 252 at the same instant it is admitted through restriction 251. The pressure in conduit 113 is conveyed to chamber 125 and imposed on valve 105 to generate a force that is greater than the force of spring 99, thus forcing valve 105 against stop 109. Contoured valve 112 in engagement with valve 105 is forced to the full-up position by the action of spring 110 and pressure in chamber 126. The contoured surface of valve 112 in the full-up position presents a minimum restriction between conduit 120 connected to boost pressure via valve 112. At start-up speed, speed pressure transducer 17 generates a relatively low pressure that is further reduced in conduit 120 by the action of fixed restriction 42 and valve 112. Thus during start-up, the pressure conveyed by conduit 120 via conduit 131 to chamber 136 of pressure selector valve 130 is lower than the pressure in conduit 139. Also during start-up, the $T_1$ transducer is maintained against stop 109 thus providing the so-called "hot day" (approx. 100° F.) fixed acceleration fuel flow curve shown generally in FIG. 6, and particularly from points B to D on the curve of FIG. 3. Also during start-up, lever 148 is positioned on the low contour slope of cam 153 by cam follower 152 such that the force generated in chamber 253 by boost pressure acting on valve 142 is sufficient to overcome the force of governor spring 146 and move valve 142 such that the upper land of valve 142 blocks chamber 205 to prevent fluid at servo pressure from being transmitted from conduit 204 to conduit 138. Hence the fluid in conduit 138 is at boost pressure. Accordingly, the pressure transmitted to chamber 136 of selector valve 135 by conduit 138 via conduit 132 is boost pressure. Thus at start-up, the pressure transmitted to the pressure selection valve by conduit 139 via conduit 133 is the highest, this is the pressure transmitted by pressure selector valve 130 to nozzle actuator 221 via interconnected conduits 215, 216 and 218. Nozzle actuator system 221 is so constructed that each discrete pressure in 219 represents a single discrete fixed nozzle angle position.

Figure 4:
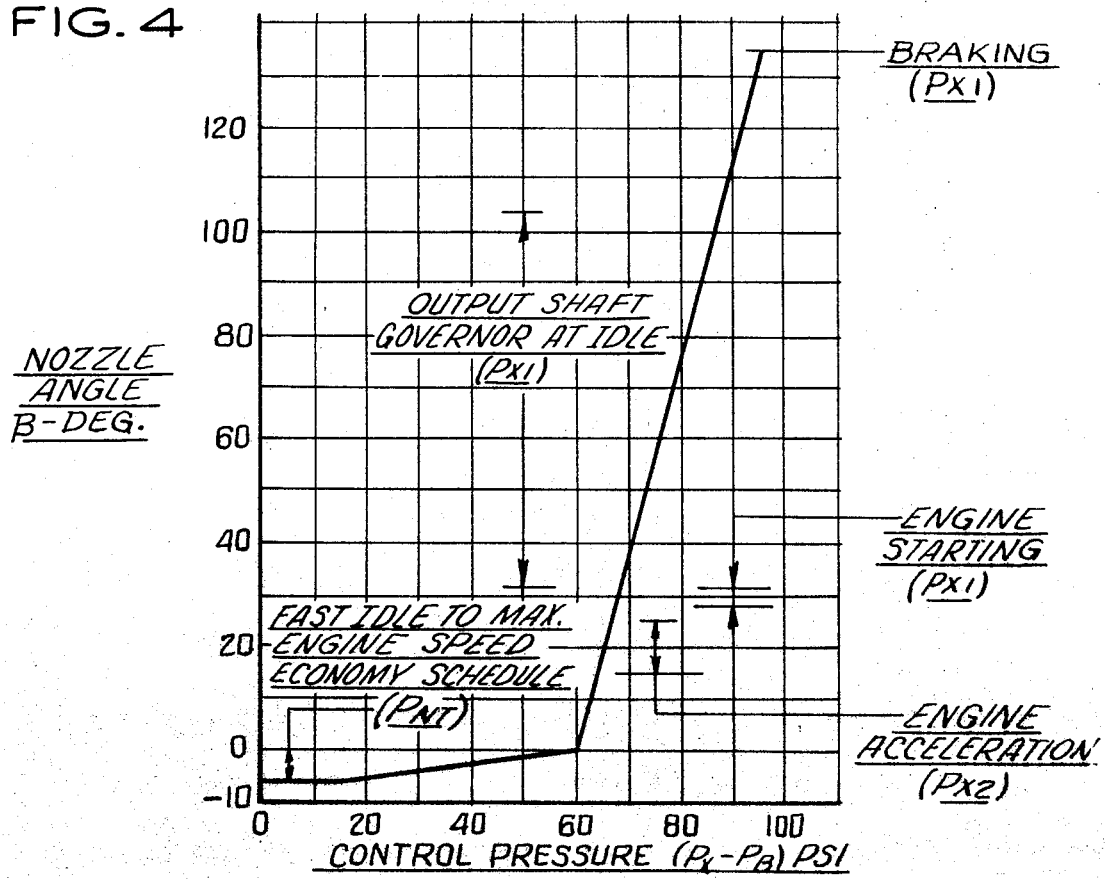
Figure 5:
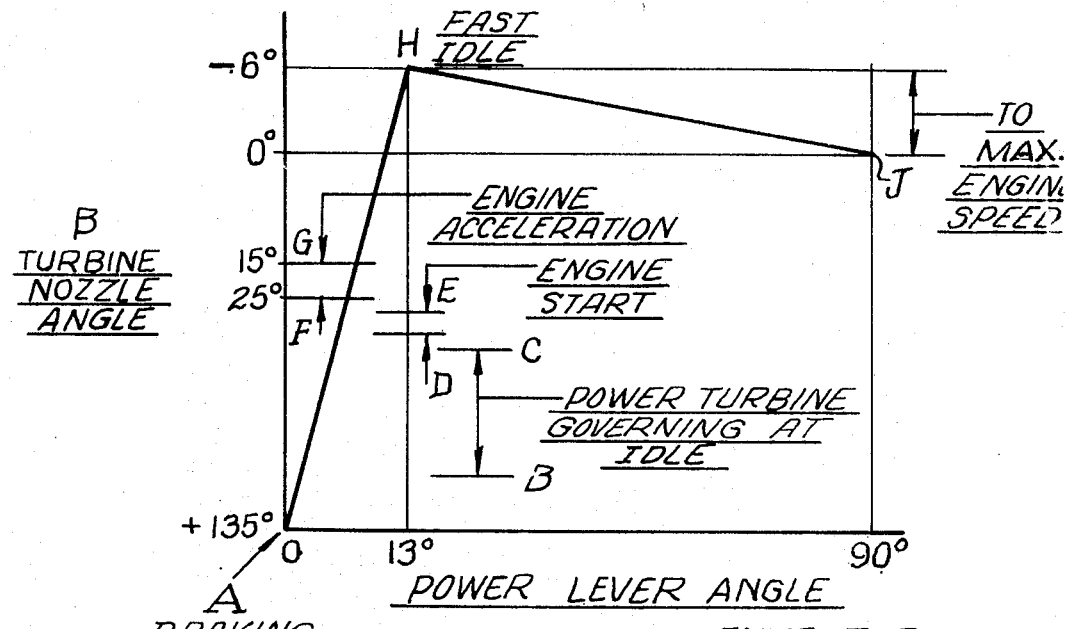

The pressure in chamber 154 of power turbine speed governor is supplied via interconnected fixed restriction 156 and conduit 155 by a speed pressure transducer (similar to the one shown generally at 17) secured to the power turbine output shaft such that said pressure transducer generates a pressure as a function of power turbine output speed. The pressure in chamber 154 acts on diaphragm 157 to generate a force that opposes the force of spring 160 and ambient pressure to move valve 158 in accordance with the magnitude of the pressure in chamber 154. The movement of valve 158 varies the magnitude of the restriction in conduit 139 and hence the magnitude of the pressure conveyed to nozzle actuator assembly 221. The contour of the lower portion of valve 158 is so constructed as to maintain the power turbine at a preselected idle speed by varying the angle of the power turbine nozzles. Thus at engine start, valve 158 provides a preselected fixed restriction that generates a preselected pressure such that the variable power turbine nozzles are scheduled to the preselected start angle, as shown in FIGS. 4 and 5; and then as the engine speed increases valve 158 varies the pressure to β-actuator 221 to control the power turbine speed independent of the gas generator speed at the preselected low idle speed by varying the angle of the variable position power turbine nozzles to maintain the preselected power turbine speed for a selected narrow range of power lever movement from the low idle position.

High idle condition

It is well known that gas turbine power plants require considerable time to accelerate from idle to the full power. Accordingly, the gas generator in the instant engine is provided with means to increase its speed when an imminent power utilization condition is indicated. This condition is the so-called "high idle" condition. Referring generally to FIGS. 1 and 2, when power utilization is imminent the selector lever is moved from the "idle" to the "drive" position, thereby de-energizing high idle solenoid 201. When high idle solenoid 201 is de-energized, spring 258 urges plunger 202 into engagement with retainer 147 and compress spring 146 independent of the action of lever arm 148 to thus increase the force on valve 142. This increased force on valve 142 shifts valve 142 downward to a preselected position such that the contoured surface 144 of valve 142 presents a greater restriction and hence increases the metered fuel flow to the gas generator with a resultant increase in gas generator speed to the "high idle" speed. The increase to the "high idle" condition is represented in FIG. 3 as the change from point C to point D. This change is defined by the magnitude of the increase of the force on spring 146 created by the de-energization of the high idle solenoid 201 to thus reduce the bypass flow of governor valve 142. This "high idle" condition increases the gas generator speed just prior to the application of power by the turbine and hence reduces the engine acceleration time.

Constant speed governing and fuel metering operation

As the gas generator speed increases from the start condition, the pressure ($P_N$) produced by the speed pressure transducer 17 increases. The pressure ($P_N$) which is a function of the square of the gas generator speed is discharged through conduit 38 into interconnecting conduit 39 where it is transmitted to chamber 70 of metering head pressure regulator valve 41 and simultaneously to one face of land 115 of speed pressure switch 40. The increase of pressure ($P_N$) with increase in speed causes the force acting on one face of land 115 to increase and overcome the force of spring 102 to move land 115 axially to the position where the flow of fluid from conduit 118 to conduit 77 past land 115 is blocked. When land 115 blocks conduit 118, the pressure in conduit 77 is reduced to boost pressure while the pressure in conduit 118 is elevated to servo pressure which is transmitted via conduit 118 to chamber 186 of pressurizing valve 180 and chamber 258 of pressurizing valve 193. The introduction of servo pressure to pressurizing valves 180 and 193 increases the level of the minimum supply pressure available to operate the nozzle actuator from the initial start condition value. The increase in the minimum actuator pressure level occurs at Station B, as shown in FIG. 3. As the gas generator speed continues to increase, land 117 of the speed pressure switch valve is axially displaced to the point where conduit 119 is placed in fluid communication with conduit 113. The fluid interconnection of conduits 113 and 119 permits the same pressure introduced into conduit 113 via fixed orifice 252 in conduit 114 to be simultaneously introduced into chambers 125 and 100, thus producing a pressure and force balance on valve 105. The pressure in chamber 126 generates a force on valve 111 which in combination with the force of spring 110 balances the force of compound springs 99 and 106 to initially retain valves 112 and 111 in operative association with valve 106 in the "hot day" position against stop 109. A change in compressor inlet temperature will cause the bimetallic element of the compressor inlet sensor 94 to be displaced, thus rotating arm 96 to depress element 97 and valve 98 to thereby increase the compression of springs 99 and 106 to force valves 112 and 111 to move downward and thus vary the restriction between conduits 87 and 171 and the boost pressure port. The interconnection between conduits 119 and 113 occurs at the high idle speed condition shown as Station D in FIG. 3, and the effect on metered fuel flow for a decrease in compressor inlet temperature with all other conditions remaining constant is depicted by the family of curves starting at Station D in FIG. 3. Simultaneous with the application of the gas generator speed transducer pressure ($P_N$) to speed pressure switch 40, the same pressure ($P_N$) is applied to chamber 70 of the metering head pressure regulator 41. The pressure ($P_N$) in chamber 70 generates a force on valve 58 that in conjunction with the force of spring 73 transmitted to valve 58 via plunger 68 opposes the force generated by the pump outlet pressure ($P_F$) transmitted to the opposite end of valve 58 via conduit 57. Valve 58 is positioned responsive to the magnitude of the forces acting on the opposite ends thereof to establish the pressure drop across the metering orifice. The magnitude of the metered pressure in conduit 3 is dependent upon the position of metering valve 58 which in turn is positioned responsive to speed pressure transducer output pressure ($P_N$) which is a function of the square of the gas generator speed.

A variable area orifice is positiond in series flow relationship with the outlet of pump 1 and is fluidly connected to pump 1 by interconnecting conduits 3 and 8. A valve 85 with a contoured land 84 is positioned in the orifice such that axial movement of the valve will produce a variable area in the orifice. Spring 88 is positioned at one end of valve 85 to create a force that is opposed by a lever arm positioned on the opposite end of valve 85 and pivotably attached to an adjusting mechanism 91. A temperature sensor 93 senses the temperature of the working medium upon discharge from the regenerator and is operatively associated with link 89 to vary the area of the discharge orifice as a function of regenerator discharge temperature.

A second variable orifice is positioned in series flow relationship with the output of valve 85 and is fluidly connected to valve 85 by means of conduit 87. Valve 111 is positioned in the second variable orifice such that axial movement of valve 111 will produce a variable area in said second orifice. Valve 111 is axially moved by a variation in compressor inlet temperature to vary the restriction between conduits 87 and 171 to vary the area of said second orifice as a function of compressor inlet temperature.

A third variable area orifice is positioned downstream of said second orifice in series flow relationship with said first and second variable area orifices. A change in ambient pressure will cause bellows 172 to be displaced, thus pivotably rotating arm 173 in operative association with valve 174 to force valve 174 to be axially displaced and thus vary the restriction between conduits 171 and 179. The displacement of bellows 172 causes valve 174 to vary the area of the third variable area discharge orifice as a function of ambient pressure.

The pressure ($P_N$) generated by the speed pressure transducer 17 is transmitted to conduit 120 through fixed orifice 42 and is simultaneously transmitted to valve 112 and chamber 141 via interconnected conduit 120. Valve 112 varies the restriction between conduit 120 and the boost pressure port responsive to variations in compressor inlet temperature to generate a pressure ($P_{NT}$) in conduit 120 that is a function of the square root of the compressor inlet pressure. Thus, the pressure ($P_{NT}$) is a function of corrected gas generator speed. The pressure ($P_{NT}$) is transmitted to chamber 141 of the governor valve and is impressed on diaphragm 145 to generate a force that is balanced by the force of governor spring 146. The governor actual speed signal ($P_{NT}$) is compared with the desired speed as determined by the preload of governor spring 146 as set by the power lever 254. When actual speed exceeds the set speed, the force unbalance on the governor valve 142 causes it to open and bypass metered flow from conduit 90 past contoured valve 144 to chamber 253 as a function of speed error. Conversely, valve 142 closes and the first, second and third variable orifices in series generate a variable orifice area responsive to selected variable engine parameters, and the metering head pressure regulator 41 maintains a regulated pressure across the composite variable orifice area as a function of the gas generator speed such that the composite of the control metering section always maintains a fuel flow at the acceleration level dictated by the engine parameters.

During normal speed governing and fuel metering operation, start-idle beta schedule valve 161 is open, thus connecting chamber 164 to conduit 165. Retard solenoid 194 is energized; thus conduit 165 and conduit 300 are connected to chamber 200 which is in fluid communication with the boost pressure port. Hence, servo supply pressure entering chamber 164 through fixed orifice 250 is communicated to boost pressure via interconnected chamber 164, conduit 165 and chamber 200 such that the pressure in conduit 139 is at substantially boost pressure. Similarly, the upper land of governor valve 142 blocks conduit 203 such that the pressure maintained in conduit 138 is boost pressure which is transmitted to conduit 138 via fixed orifice 138A. The corrected speed pressure present in conduit 120 is communicated via interconnecting conduits 120 and 131 to chamber 136 of pressure selector valve 135. Since the pressure in conduit 131 is higher than the pressure in conduits 132 and 133, pressure selector valve 135 transmits the pressure in conduit 131 via interconnected chamber 136, conduits 216, 218 and chamber 219 to diaphragm 223 of nozzle actuator 221 such that actuator 234 positions the nozzles in the most economical operating position for each valve of gas generator speed. The range of nozzle positions for the normal speed governor fuel metering range are shown as indicated in FIG. 4, and Stations H to J of FIG. 5.

Acceleration

The power lever 254 may be advanced at an extremely rapid rate such that lever 148 by the action of cam 153 compresses governor spring 146 in such a rapid manner that governor valve 142 is almost instantly moved downward to its minimum bypass condition. This rapid increase in the magnitude of the metered flow conducted through conduit 192 to the combustion chamber of the engine will cause the gas generator to start to accelerate. However, the inertia of the gas generator is such that the gas generator turbine cannot be rapidly accelerated. Thus, to aid in the acceleration of the engine, the variable turbine nozzles are positioned at a single preselected acceleration angle calculated to best assist compressor turbine acceleration over a wide range operating conditions. When the rapid movement of power lever 254 causes governor valve 142 to be rapidly moved downward, the upper land of governor valve 142 is moved downward to a position such that conduit 203 is fluidly connected to conduit 138 via interconnected chambers 205 and 208 such that servo pressure enters fixed orifice 206 and is conducted to conduit 138 and thence to fixed orifice 138A. The fixed areas of orifices 206 and 138A are preselected such that when supply pressure is introduced into fixed orifice 206, a predetermined pressure is established in conduit 138 which is communicated via interconnected conduit 132 to chamber 136 of pressure selector valve 135. The magnitude of the preselected pressure in conduit 132 is greater than the governor speed pressure present in conduit 131 and the boost pressure in conduit 133; thus pressure selector valve 135 communicates the pressure in conduit 132 via interconnected chamber 136, conduit 216, conduit 218 and chamber 219 to diaphragm 223 to position nozzle actuator 234 to the preselected single acceleration nozzle angle. The engine acceleration nozzle angle is shown as indicated on FIG. 4, and Stations F to G of FIG. 5.

Power turbine max speed override governor

The pressure ($P_{pt}$) which is a function of power turbine speed is conducted through interconnected fixed orifice 156 and conduit 155 to chamber 154 to engage diaphragm 157 to thereby generate a force on valve 158. The force generated by the power turbine speed pressure in chamber 154 is initially opposed by the force of spring 160 and the ambient pressure of chamber 159. When valve 158 has been moved downward a preselected distance, the force of spring 160 is supplemented by the force of spring 212. At a preselected power turbine speed, the force generated by the pressure in chamber 154 will overcome the combined opposing forces of spring 160 and spring 211 such that the upper land of valve 158 will be moved downward to a position whereby conduit 210 is connected to conduit 168, thus transmitting servo supply pressure via interconnected conduit 210 and conduit 168 to valve 149. The servo pressure in conduit 168 is exhausted through fixed orifice 169 to boost pressure such that a pressure of sufficient magnitude is generated to create a force on valve 149 sufficient to compress spring 151 and pivotably move lever 148 to reduce the compression on governor spring 146 and thus decrease the metered flow to the gas generator. Hence, in response to a preselected maximum power turbine speed, the power turbine governor valve 149 will override the gas generator speed selector cam 153 and linkage 148 to reduce the gas generator speed and to thereby establish the preselector power turbine speed as a maximum overriding governor speed condition.

Retarding and braking operation

During normal speed governing and fuel metering operation of the engine, the power lever 254 is positioned at some angle intermediate the low idle and max power stops. The power lever 254 fixedly connected to cam 153 by means of interconnected shaft 255 is so constructed that rotation of power lever 254 intermediate the low idle and max stop will simultaneously move cam 153 to position roller 162 of valve 161 into engagement with the high rise contour surface of cam 153, such that valve 161 is open. With valve 161 open, servo supply pressure ($P_s$) is transmitted through fixed orifice 250 into conduit 165 via chamber 164 and thence into chamber 200 such that the pressure in conduit 165 is substantially boost pressure ($P_B$). Simultaneously, the pressure in chamber 154 which is a function of power turbine speed has increased with the increase in power turbine speed to the point where the pressure acting on diaphragm 157 is of a magnitude sufficient to override the force of spring 160 and the ambient pressure of chamber 159 and move valve 158 downward to block conduit 139 from the boost pressure port. Since the power turbine is connected to the gas generator only by means of a fluid coupling, very little braking force is provided by a free power turbine configuration. Accordingly, on certain ground vehicle applications, it is desired to increase the braking effect of the free power turbine during power lever retardation and downhill braking operations. When the rotative force is removed from the power lever 254, spring 256 will return power lever 254 to the low idle stop position. Movement of the power lever 254 to the idle stop position will rotate cam 153 to a position such that valve 161 is closed. The pressure in conduit 139 rises to servo supply pressure when valve 161 and valve 158 close interconnected conduits 165 and 300 to pump boost pressure. The pressure in conduit 139 is transmitted through pressure selector valve 136 to nozzle actuator 221 such that the actuator and consequently the variable power turbine nozzles are moved to the full retard angle position. Should additional braking or retardation force be desired, such as in downhill operation where it is desired to utilize the engine as a braking means to retard the forward speed vehicle, the retard solenoid 194 is de-energized. De-energization of the retard solenoid causes spring 199 to urge solenoid valve 196 into sealing engagement with housing 195 such that chamber 200 and fluidly connected conduits 165 and 300 are blocked from the boost pressure port. The power lever 254 can be moved to the increase power position to increase the force on spring 146 and thus move governor valve 142 downward to increase the metered flow to the gas generator. The movement of power lever 254 to the increased position will simultaneously open valve 161. However, with the retard solenoid 194 de-energized, conduit 165 and conduit 300 are blocked by valve plunger 196, thus the pressure in conduit 139 will remain at servo supply pressure to thereby maintain the variable position power turbine nozzles in the full brake position, but will permit the gas generator speed to be increased, thus permitting the retarding force exerted on the power turbine to be increased.

What I claim is:

1. In operative association with a prime mover having a compressor, a combustion chamber, a high pressure turbine, a free power turbine and a regenerator including means for discharging the combustion gas of the combustion chamber successively through a high pressure turbine, a variable geometry nozzle assembly, a free power turbine and a regenerator; a fuel, speed and nozzle positioning control having means for varying the engine power level, means for metering preselected fuel flow to said combustion chamber in accordance with a preselected composite function of a plurality of engine parameters, positioning means functionally connected to said variable geometry nozzles metering means and power level varying means to generate a coordinated prescheduled fuel flow and nozzle position as a function of the position of said power level varying means, including the improvement wherein the means for varying the power level comprises
   (a) speed selector lever means for selecting a desired operating speed of said free power turbine,
   (b) a source of working fluid under pressure,
   (c) free power turbine speed responsive means including a valve controlling a variable restriction,
   (d) selector lever position responsive valve means, including first and second outlets,
   (e) a first passage connected to said first outlet and a point upstream of said free turbine speed responsive valve variable restriction and a second passage connected to said second outlet and a point downstream of said free turbine speed responsive variable restriction such that said power turbine speed responsive valve modifies said working pressure during the turbine start condition to position said variable geometry nozzles such that said free power turbine speed is controlled solely by means of nozzle position during turbine idle, and said selector lever position responsive valve modifies said working pressure to move said variable position nozzles to a preselected braking position during turbine retard operation.

2. A device, as claimed in claim 1, wherein the means for varying the power level includes
   (a) a retard valve fluidly connected in said second passageway intermediate said second outlet and said variable valve restriction,
   (b) said retard valve constructed and arranged to disconnect said downstream passageway from a first referenced pressure upon receipt of a retard signal by said retard valve.

3. The device of claim 2 wherein the said free power turbine responsive valve comprises
   (a) a pressure responsive valve having a first and a second chamber having a movable wall therebetween,
   (b) said first chamber having an inlet connected to a second referenced pressure,
   (c) said second chamber having an inlet receiving a pressure signal communicated as a function of actual free power turbine rotational speed to thereby position said power turbine valve as a function of actual power turbine rotation speed.

4. The device of claim 2 wherein said first referenced pressure is control pump boost pressure ($P_B$).

5. The device of claim 3 wherein said second referenced pressure is ambient pressure ($P_{amb}$).

6. In combination with a gas generator having a compessor turbine wherein the combustion gas of said gas generator is successively discharged through said compressor turbine, a variable geometry nozzle assembly, a free power turbine, and a regenerator; a fluel, speed and nozzle position control having power selecting means for varying the gas generator operating conditions, actuator means for positioning the variable geometry nozzles, metering means functionally connected to actuator means to cojointly establish preselected metered fuel rates and preselected nozzle positions as a function of the position of said power selecting means including the improvement wherein the power selecting means comprises
  (a) speed selector lever means for selecting a desired turbine operating speed,
  (b) free power turbine speed responsive valve means having an inlet and an outlet, said free power turbine speed responsive valve positioned responsive to a pressure signal received as a function of actual free power turbine rotational speed referenced to ambient pressure,
  (c) selector lever position responsive valve means receiving a pressurized motive flluid and fluidly connected to said free power turbine speed responsive inlet and outlet such that movement of said free power turbine speed valve modifies said motive fluid pressure with reference to an independent second source of pressure to thereby control the free turbine idle speed solely by positioning said variable geometry nozzle.
  (d) means for adjusting said working pressure responsive to movement of said selector lever responsive valve to thereby move said variable geometry nozzle to a braking position.

7. A control device, as described in claim 6, wherein a two-position retard valve is fluidly connected intermediate said selector lever positive responsive valve and said free power turbine speed responsive valve such that in one position of said retard valve said motive fluid is referenced to said second independent source of pressure and in the other position of said retard valve said referenced pressure is removed thereby modifying said motive fluid pressure to reposition said variable geometry nozzle to a preselected retard position thereby permitting an increase in braking force with an increase in turbine speed.

8. A control device, as described in claim 7, wherein said power turbine speed responsive valve includes
  (a) a pressure responsive valve having a first and a second chamber separated by a flexible diaphragm,
  (b) said first chamber receiving ambient pressure,
  (c) said second chamber receiving a pressure signal that is a function of actual power turbine rotational speed,
  (d) a valve extension secured to said diaphragm and positioned in fluid restrictive communication with said motive fluid so as to modify the pressure of said motive fluid responsive to variations in pressure in said second chamber.

References Cited

UNITED STATES PATENTS

| | | | |
|---|---|---|---|
| 3,209,537 | 10/1965 | Mock | 60—39.25 XR |
| 3,243,596 | 3/1966 | Loft | 60—39.25 XR |
| 3,300,966 | 1/1967 | Chadwick | 60—39.25 XR |
| 3,357,178 | 12/1967 | Meyers | 60—39.25 |
| 3,383,090 | 5/1968 | McClean | 60—39.25 XR |

CARLTON R. CROYLE, Primary Examiner

U.S. Cl. X.R.

60—39.25, 39.28